2,868,774
Patented Jan. 13, 1959

2,868,774

METALLIZABLE AZO DYES PREPARED FROM AMINO-BENZOTHIAZOLE DERIVATIVES AND β-NAPHTHOL DERIVATIVES

James M. Straley and John G. Fisher, Kingsport, Tenn., assignors to Eastman Kodak Company, Rochester, N. Y., a corporation of New Jersey No Drawing. Application April 15, 1957
Serial No. 652,690

13 Claims. (Cl. 260—146)

This invention relates to certain metallizable azo dyes and to their metallized complexes.

The non-metallized dyes within the scope of this invention have the structural formula:

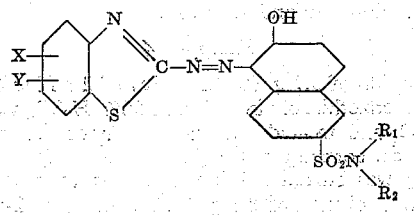

wherein X and Y are selected from the group consisting of hydrogen, halogen, nitro, alkoxy, alkylsulfonyl, alkoxyalkoxy, thioalkyl, thiocyano and hydroxyalkyl, and $R_1$ and $R_2$ are selected from the group consisting of hydrogen, hydroxyalkyl, alkyl, cyanoalkyl, alkoxyalkyl, dihydroxyalkyl, trihydroxyalkyl, chloroalkyl, carboxyalkyl and a heterocyclic morpholide ring containing the amino nitrogen atom and $R_1$ and $R_2$.

The non-metallized dyes that are employed in preparing the dyes of this invention are prepared by diazotizing an amine having the structural formula:

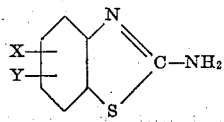

The resulting diazo compound is then reacted or coupled with a β-naphthol derivative having the structural formula:

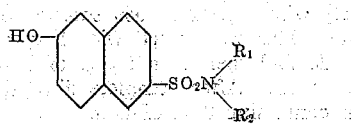

In the above structural formulas, for the amino compounds and the β-naphthol derivative, X, Y, $R_1$ and $R_2$ are as defined in the formula set forth above for the dyes of this invention. One method of carrying out the diazotization reaction involves dissolving the amino compound in an aqueous hydrochloric acid solution and then adding sodium nitrite. The details of the diazotization reaction are set forth in the specific examples and the procedures described in those examples represent methods by which the diazotization reaction can be carried out. The non-metallized dyes, after their preparation, are reacted with a metal salt, such as suitable salts of nickel, cobalt, copper, chromium, manganese, iron or vanadium. The non-metallized azo compounds can be metallized either on or off the materials they color. Metallization can be carried out, for example, by treating the non-metallized azo compound with a solution or dispersion of the metallizing agent. Although the metal complex is often formed at room temperature, we prefer to accelerate the process by heating, usually with steam, for a short period of time. The metallization is effected by procedures well known to those skilled in the art to which this invention is directed.

Illustrative of the metallizing agents that can be employed are the halides, the sulfates, the acetates, the cyanides and the thiocyanates of nickel, cobalt, chromium, manganese, iron and vanadium as well as various copper compounds. Thus, nickel chloride, nickel bromide, nickel sulfate, nickel acetate, nickel cyanide, nickle formate, nickel thiocyanate $[Ni(SCN)_2]$, cobaltous bromide, cobaltic chloride, cobaltous chloride, cobaltous acetate, cobaltous cyanide, cobalt thiocyanate $[Co(SCN)_2]$, cupric chloride, cupric bromide, cupric acetate, cupric lactate, chromium trichloride, chromium tribromide, chromic sulfate, chromic acetate, chromium thiocyanate $[Cr(SCN)_3]$, manganese chloride, manganous sulfate, manganese acetate, manganese thiocyanate $[Mn(SCN)_2]$, ferric chloride, ferric fluoride, ferrous acetate, ferrous thiocyanate $[Fe(SCN)_2]$, ferric thiocyanate $[Fe(SCN)_3]$, and vanadium thiocyanate $[V(SCN)_2]$ are illustrative of the metallizing agents that can be employed.

The non-metallized monoazo compounds described herein are useful for the dyeing of cellulose alkyl carboxylic acid esters having 2 to 4 carbon atoms in the acid groups thereof, nylon, sulfone polyesters, polyethylene terephthalate and polyacrylonitrile. After application to these materials, usually in the form of textile materials, the dye is metallized thereon. The metallized azo compounds of our invention can be applied by ordinary dyeing or printing techniques to nitrogenous textile materials such as wool, silk, nylon and acrylonitrile polymers, for example. Coloration can also be effected by incorporating the non-metallized or metallized azo compounds into the spinning dope, spinning the fiber as usual and converting the non-metallized azo compounds to their metallized form. Also the metallizing agent can be incorporated in the spinning dope, the fiber spun as usual and then dyed with the non-metallized monoazo compounds to form the metal complex on the fiber. The new metallized dyes of our invention are preferably formed by heating the non-metallized azo dye with the metallizing agent in organic solvents such as, for example, cellulose acetate, cellulose acetate-propionate, acrylonitrile polymers, polyamides, methyl cellosolve and formamide.

As is well known, one of the disadvantages dyed cellulose acetate textile fabrics suffer in comparison with some of the dyed competing textile fabrics, such as cotton, wool and viscose, for example, is lack of fastness to washing. Many schemes have been proposed to remedy this situation but all suffer from some significant fault. By means of our invention dyed cellulose acetate textile materials having good to excellent fastness to washing, light and gas are obtainable. These results may be obtained by dyeing the cellulose acetate textile material with the non-metallized azo compounds and then treating the dyed cellulose acetate textile material with suitable metal salts which cause the original dye to form metallic complexes which are resistant, for example, to the action of washing, light and gas. These results can also obtained by incorporating the metallized azo dye into the cellulose acetate spinning dope and spinning the fiber as usual. Thus, by means of the present invention, the disadvantage noted above with respect to the wash fastness of dyed cellulose acetate textile materials is either entirely or largely overcome. Cellulose acetate has been particuarly referred to because it is the most widely used cellulose alkyl carboxylic acid ester.

When the metal complex is formed on a cellulose alkyl carboxylic acid ester, such as cellulose acetate fiber, the use of a metal thiocyanate appears to be advantageous and is preferred. Nickel thiocyanate appears to be especially useful and particular claim is laid to its use. Next to nickel thiocyanate the use of cobalt thiocyanate is preferred.

Metallization will be described in detail with reference to nickel and cobalt inasmuch as the metallized dyes containing these materials in complex combination appear to be advantageous. However, it will be clearly understood that the non-metallized azo compounds can be metallized with the other metals disclosed herein. The azo compounds disclosed herein have varying utility as dyes. The degree of utility varies, for example, depending upon the material being colored and the actual dye employed.

The following examples are illustrative of this invention.

Example 1

A solution of 1.9 g. sodium nitrite in 12.5 cc. of concentrated $H_2SO_4$ were prepared at 70° C. To this solution there was added with good stirring 25 cc. of mixed propionic-acetic acid (1:5), hereinafter referred to as 1:5 acid. The mix was brought to 0° C. and 4.55 g. (0.025 mole) of 2-amino-6-methoxy-benzothiazole were added, maintaining the temperature below 5° C. 25 cc. of 1:5 acid were added at this temperature and the mix stirred 2 hours further. The diazo thus prepared was added to a solution of 7.8 g. of N,N-di-β-hydroxyethyl-2-naphthol-6-sulfonamide in 80 cc. of 1:5 acid at 5° C. After 30 minutes the mineral acid was neutralized to Congo red with ammonium acetate and the coupling allowed to proceed at 10-20° C. for 2 hours. The dye was then precipitated by drowning in about 1500 cc. of cold water. The product was filtered off, washed with water and dried in vacuo at 60° C. The yield was 10.5 g. of product having the formula:

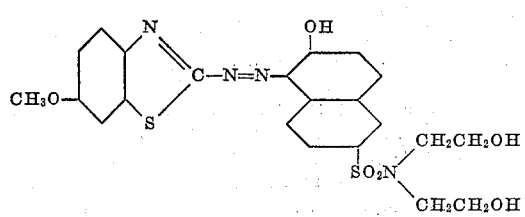

and dyeing polyacrylonitrile fiber in blue shades of good light fastness.

Example 2

2-amino-6-methoxybenzothiazole was diazotized as in Example 1. The coupler in Example 1 was replaced by 8.2 g. of N,N-di-β-cyanoethyl-2-naphthol-6-sulfonamide. According to the procedure of Example 1, there was obtained 12.8 g. of product having the formula:

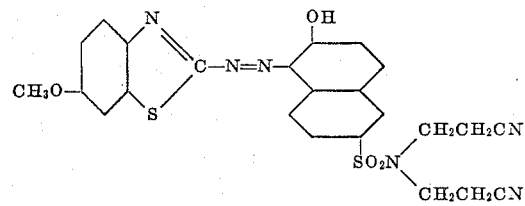

and which dyes polyacrylonitrile fiber in blue shades of good fastness to the action of light.

Example 3

The products of Examples 1 and 2 on cellulose acetate produce reddish-orange shades of poor fastness to the action of light or laundering agents. The dyeings so obtained were padded with a 2% solution of nickel thiocyanate under such conditions that the pickup is 60-100% on the weight of the goods. The dried cloth was steamed 10 minutes at 5 p. s. i., rinsed 10 minutes at 120° F. in a solution of 0.5% $Na_2CO_3$ and 0.5% soap, rinsed and dried. The resulting deep, bright blue fabrics showed no break after 20 hours exposure on the fadeometer, whereas the original dyeing broke badly after only 5 hours. Furthermore, the fabrics withstand with no alteration, a standard AATCC wash test at 160° F. with soap and soda ash.

Example 4

A solution of 5.7 g. (0.025 mole) of 2-amino-6-methylsulfonylbenzothiazole in 130 g. of 50% $H_2SO_4$ was cooled to 0° C. and treated with a solution of 2.1 g. $NaNO_2$ in 12.5 cc. concentrated $H_2SO_4$ below 5° C. The diazo solution was stirred 2.5 hours at this temperature and run into a solution of 8.3 g. (0.025 mole) of 2-naphthol-6-sulfomorpholide in 150 cc. of 1:5 acid at 0-5° C. The mineral acid was neutralized to Congo with ammonium acetate and stirred 2 hours longer without cooling. The product was drowned in 2000 cc. water and isolated by filtering, washing and drying at 60° C. The yield was 8.8 g. of a solid having the formula:

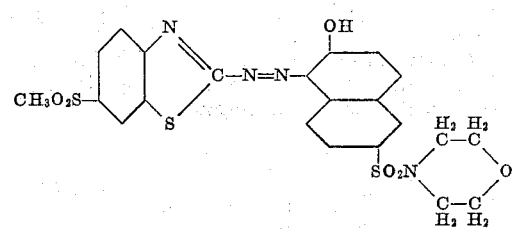

and dyeing polyacrylonitrile fiber in violet shades.

Example 5

0.500 g. of the product of Example 4 was ground intimately with 2 g. of a 10% solution of sodium lignin sulfonate. This was mixed with 5 g. of di-β-hydroxyethylsulfide and then with 50 g. of a 6% gum tragacanth solution. After complete dispersion, 30 g. of a solution containing 8 g. of ammonium thiocyanate and 4 g. of nickelous chloride crystals was stirred in. A cellulose acetate cloth was printed on a roller print machine with the so-obtained paste, dried, and aged 10 minutes at 5 p. s. i. steam pressure. The fabric was soaped at 120° F. with a solution of 0.5% soap and 0.5% $Na_2CO_3$. After rinsing with hot water and drying there was obtained a fabric bearing deep violet patterns on a clear white ground. The print had excellent resistance to the action of light or laundering agents.

The following table lists additional examples of dyes within the scope of this invention showing the colors of the non-metallized and metallized dyes.

| Substituted 2-Amino-benzothiazole | Coupler Used | Metal Used | Color Original | Color Final |
|---|---|---|---|---|
| 6-Methoxy | N,N-Di-β-hydroxyethyl-6-hydroxynaphthalene-2-sulfonamide. | Ni / Co | Red / do | Blue. / Navy. |
| Do | 6-Hydroxynaphthalene-2-sulfomorpholide. | Ni / Co | do / do | Blue. / Do. |
| Do | N-Methyl-6-hydroxy-naphthalene-2-sulfonamide. | Ni / Co | do / do | Do. / Do. |
| Do | N,N-Di-β-hydroxyethyl-7-hydroxynaphthalene-1-sulfonamide. | Ni / Co | do / do | Reddish-blue. / Do. |
| Do | N-β-Methoxyethyl-7-hydroxynaphthalene-1-sulfonamide. | Ni / Co | do / do | Do. / Do. |
| Do | N-β-Hydroxyethyl-6-hydroxynaphthalene-2-sulfonamide. | Ni / Co | do / do | Blue. / Navy. |
| Do | N,N-Di-β-cyanoethyl-6-hydroxynaphthalene-2-sulfonamide. | Ni / Co | do / do | Blue. / Navy. |
| Do | 7-Hydroxynaphthalene-2-sulfomorpholide. | Ni / Co | do / do | Blue. / Gray. |
| Do | N-Ethyl-N-β-hydroxyethyl-6-hydroxy-naphthalene-2-sulfonamide. | Ni / Co | do / do | Blue. / Navy. |
| Do | N-Glyceryl-6-hydroxy-naphthalene-2-sulfonamide. | Ni / Co | do / do | Blue. / Gray. |
| Do | N-Methyl-N-carboxy-methyl-6-hydroxy-naphthalene-2-sulfonamide. | Ni / Co | Yellow / do | Red. / Do. |
| Do | N-β-Hydroxypropyl-6-hydroxynaphthalene-2-sulfonamide. | Ni / Co | Red / do | Blue. / Navy. |
| Do | N-Trimethylolmethyl-6-hydroxynaphthalene-2-sulfonamide. | Ni / Co | do / do | Blue. / Gray. |
| Unsubstituted | N,N-Di-β-hydroxyethyl-6-hydroxynaphthalene-2-sulfonamide. | Ni / Co | Orange / do | Blue. / Violet. |
| Do | N-β-Hydroxypropyl-6-hydroxynaphthalene-2-sulfonamide. | Ni / Co | do / do | Blue. / Violet. |
| 6-Methylsulfonyl | N,N-Di-β-hydroxyethyl-6-hydroxynaphthalene-2-sulfonamide. | Ni / Co | do / do | Do. / Gray. |
| Do | N-β-Hydroxyethyl-6-hydroxynaphthalene-2-sulfonamide. | Ni / Co | do / do | Violet. / Do. |
| Do | 7-Hydroxynaphthalene-2-sulfonamide. | Ni / Co | do / do | Do. / Do. |
| Do | N,N-Di-β-hydroxyethyl-7-hydroxynaphthalene-1-sulfonamide. | Ni / Co | do / do | Do. / Do. |

Example 6

The amine of Example 2 was replaced by 2-amino-5-methoxybenothiazole. The resulting dye imparted orange shades to cellulose acetate which, upon treatment with nickel thiocyanate yielded deep blue fabrics of excellent fastness properties.

Example 7

11.45 g. (0.05 mole) of 2-amino-6-bromobenzothiazole were dissolved in 125 g. 50% $N_2SO_4$. At 0–3° C. there were added a nitrosylsulfuric acid solution prepared from 3.8 g. of $NaNO_2$ and 25 cc. of $H_2SO_4$. After stirring for two hours below 5° C. the diazo so prepared was run into a solution of 16 g. of N,N-di-β-hydroxyethyl-2-naphthol-6-sulfonamide in 160 cc. of 1:5 acid at 5° C. The mix was neutralized after 20 minutes and worked up as in Example 1. The product yielded orange shades on cellulose acetate which were transformed to bluish-violet of excellent fastness properties by treatment with nickel thiocyanate.

Example 8

The amine in Example 1 was replaced by 4.86 g. of 2-amino-5,6-dimethoxybenzothiazole. Proceeding as in Example 1, a dye was obtained that produces fast blue shades when treated with nickel thiocyanate on cellulose acetate.

Example 9

The amine in Example 1 was replaced by 5.6 g. of 2-amino-6-β-methoxyethoxybenzothiazole and the coupler by 7.7 g. of N-β,γ-dihydroxypropyl-2-naphthol-6-sulfonamide. The resulting dye is a blue-violet shade after treatment with nickel thiocyanate.

Example 10

The amine in Example 2 was replaced by 4.5 g. of 2-amino-4,6-dimethylbenzothiazole. The resulting dye, after treatment with nickel thiocyanate, produces clear blue shades of excellent fastness on cellulose acetate.

Example 11

The coupler in Example 1 was replaced by 5.6 g. of 2-naphthol-6-sulfonamide. The resulting dye imparts to cellulose acetate orange shades and, after treatment with nickel thiocyanate, the resulting dye produces deep blue colors of excellent fastness to light and washing.

Example 12

The amine in Example 1 was replaced by 5 g. of 2-amino-6-methylthiobenzothiazole. After treatment with nickel thiocyanate, the resulting dye imparts a blue color to cellulose acetate fabrics.

Example 13

The amine in Example 11 was replaced by 5.25 g. of 2-amino-6-thiocyanobenzothiazole. The resulting dye, after treatment with nickel thiocyanate, imparts a blue-violet color to cellulose acetate.

Example 14

9.9 g. of 2-amino-6-nitrobenzothiazole were diazotized as in Example 7 and then coupled with 15 g. of N-β-methoxyethyl-2-naphthol-6-sulfonamide, as in Example 7. The resulting dye, after treatment with nickel thiocyanate, produces a violet color on cellulose acetate.

Example 15

The amine in Example 7 was replaced by 9.8 g. of 2-amino-6-β-hydroxyethylbenzothiazole. The resulting dye imparts a blue color of excellent fastness to cellulose acetate, after treatment with nickel thiocyanate.

In the preparation of couplers for the practice of this invention, 2-carboethoxynaphtholsulfonyl chloride was prepared according to Ber. 51, 359 (1918). 25 g. (0.08 mole) of 2-carboethoxynaphthol-6-sulfonyl chloride was slurried in 100 g. of dry benzene. With good stirring, 12.5 g. of ethanolamine was added without cooling. The mix was stirred 15 minutes, and the benzene decanted off. The oily mass was added to 100 cc. of 10% NaOH, brought to a boil for 10 minutes, cooled and acidified with HCl. The precipitate was filtered off, washed with water and dried. The yield was 14–18 g. of N-β-hydroxyethyl-2-naphthol-6-sulfonamide, melting at 157.5–9° C.

In like manner the intermediates in the following table were prepared. In the first column is shown the position of the sulfonamide group on the naphthalene nucleus. In the second column is shown the configuration of the sulfonamido group. In the third column the melting point of the coupler product is recorded. The —OH group is always in the 2 position of these couplers.

| Position | Configuration | Melting Point |
|---|---|---|
| 8 | —SO$_2$N(CH$_2$CH$_2$OH)$_2$ | 122.5–3° C. |
| 8 | —SO$_2$NHCH$_2$CH$_2$OCH$_3$ | 102–4° C. |
| 6 | —SO$_2$NHCH$_2$CH$_2$OH | 157.5–9° C. |
| 6 | —SO$_2$NHCH$_3$ | 160–63° C. |
| 6 | —SO$_2$N(CH$_2$CH$_2$CN)$_2$ | 184–86° C. |
| 7 | —SO$_2$N(CH$_2$—CH$_2$)$_2$O (morpholide) | 206–8° C. |
| 8 | —SO$_2$NH$_2$ | 188–90° C. |
| 6 | —SO$_2$NHCH$_2$CH$_2$OCH$_3$ | 105–7° C. |
| 6 | —SO$_2$N(C$_2$H$_5$)(CH$_2$CH$_2$OH) | 101–5° C. |
| 6 | —SO$_2$NCH$_2$CHOHCH$_2$OH | 185–200° C. |
| 6 | —SO$_2$N(CH$_2$CH$_2$Cl)$_2$ | Oil. |
| 6 | —SO$_2$NHC(CH$_2$OH)$_3$ | Oil. |
| 6 | —SO$_2$N(CH$_3$)(CH$_2$COOH) | Dec. 280° C. |
| 6 | —SO$_2$NHCH$_2$CHOHCH$_3$ | 155–8° C. |
| 6 | —SO$_2$N(CH$_2$CH$_2$)$_2$O (morpholide) | 218–9° C. |
| 7 | —SO$_2$NHCH$_2$CH$_2$OH | Oil. |
| 6 | —SO$_2$N(CH$_2$CH$_2$OH)$_2$ | 164.5–6° C. |

We claim:
1. As a composition of matter, the azo compounds selected from the group consisting of monoazo compounds and their metal complexes containing a metal selected from the group consisting of chromium, cobalt, copper, iron, manganese, nickel and vanadium, said monoazo compounds having the structural formula:

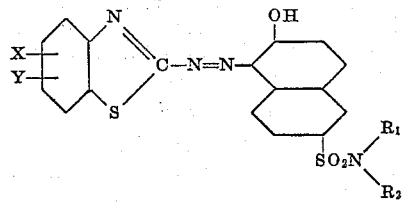

wherein X and Y are selected from the group consisting of hydrogen, bromine, nitro, alkoxy, alkylsulfonyl, alkoxyalkoxy, thiocyano and monohydroxyalkyl, and R$_1$ and R$_2$ are selected from the group consisting of hydrogen, monohydroxyalkyl, alkyl, cyanoalkyl, alkoxyalkyl, β,γ-dihydroxypropyl, trimethylolmethyl, β-chloroethyl, carboxyalkyl and heterocyclic morpholide ring containing the amino nitrogen atom and R$_1$ and R$_2$ and wherein the terms alkyl and alkoxy refer to lower alkyl and lower alkoxy.

2. As a composition of matter, the azo compounds having the structural formula:

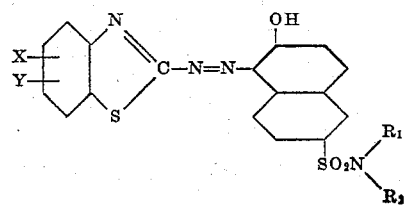

wherein X and Y are selected from the group consisting of hydrogen, bromine, nitro, alkoxy, alkylsulfonyl, alkoxyalkoxy, thiocyano and monohydroxyalkyl, and R$_1$ and R$_2$ are selected from the group consisting of hydrogen, monohydroxyalkyl, alkyl, cyanoalkyl, alkoxyalkyl, β,γ-dihydroxypropyl, trimethylolmethyl, β-chloroethyl, carboxyalkyl and a heterocyclic morpholide ring containing the amino nitrogen atom and R$_1$ and R$_2$ and wherein the terms alkyl and alkoxy refer to lower alkyl and lower alkoxy.

3. As a composition of matter, a complex metal compound containing a metal selected from the group consisting of chromium, cobalt, copper, iron, manganese, nickel and vanadium in complex combination with the monoazo compounds having the formula set forth in claim 2.

4. As a composition of matter, the azo compound having the structural formula:

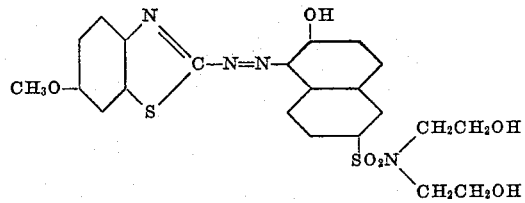

5. As a composition of matter, the azo compound having the structural formula:

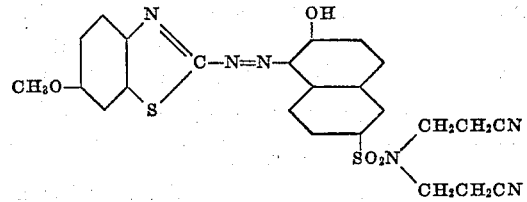

6. As a composition of matter, the azo compound having the structural formula:

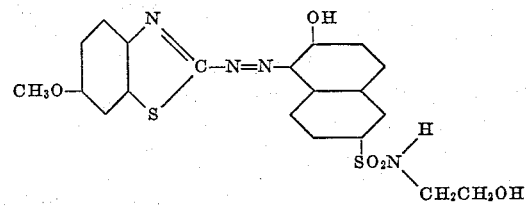

7. As a composition of matter, the azo compound having the structural formula:

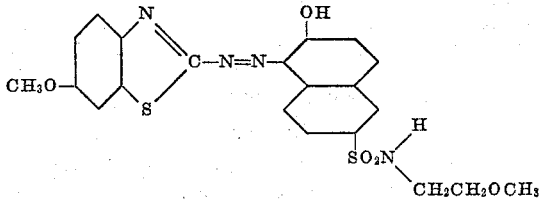

8. As a composition of matter, the azo compound having the structural formula:

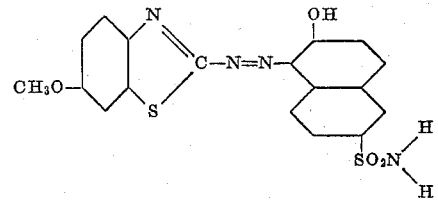

9. As a composition of matter, the nickel complex of the azo compound having the formula set forth in claim 4.

10. As a composition of matter, the nickel complex of the azo compound having the formula set forth in claim 5.

11. As a composition of matter, the nickel complex of the azo compound having the formula set forth in claim 6.

12. As a composition of matter, the nickel complex of the azo compound having the formula set forth in claim 7.

13. As a composition of matter, the nickel complex of the azo compound having the formula set forth in claim 8.

References Cited in the file of this patent

UNITED STATES PATENTS

| 2,149,051 | Helberger et al. | Feb. 28, 1939 |
| 2,336,275 | McNally et al. | Dec. 7, 1943 |
| 2,792,383 | Buehler et al. | May 14, 1957 |

FOREIGN PATENTS

| 315,506 | Switzerland | Sept. 29, 1956 |